United States Patent
Doshi et al.

(10) Patent No.: US 12,554,500 B2
(45) Date of Patent: Feb. 17, 2026

(54) TAG CHECKING PROCEDURE CALLS

(71) Applicant: Intel Corporation, Santa Clara, CA (US)

(72) Inventors: Kshitij Arun Doshi, Tempe, AZ (US); Francesc Guim Bernat, Barcelona (ES)

(73) Assignee: Intel Corporation, Santa Clara, CA (US)

( * ) Notice: Subject to any disclaimer, the term of this patent is extended or adjusted under 35 U.S.C. 154(b) by 809 days.

(21) Appl. No.: 17/709,824

(22) Filed: Mar. 31, 2022

(65) Prior Publication Data

US 2022/0222077 A1 Jul. 14, 2022

(51) Int. Cl.
*G06F 9/32* (2018.01)
*G06F 9/448* (2018.01)
*G06F 8/41* (2018.01)
*G06F 9/38* (2018.01)
*G06F 21/52* (2013.01)

(52) U.S. Cl.
CPC ............ *G06F 9/324* (2013.01); *G06F 9/4484* (2018.02); *G06F 8/41* (2013.01); *G06F 9/3806* (2013.01); *G06F 21/52* (2013.01)

(58) Field of Classification Search
CPC ....... G06F 9/3806; G06F 9/324; G06F 9/4484
See application file for complete search history.

(56) References Cited

U.S. PATENT DOCUMENTS

| | | | | |
|---|---|---|---|---|
| 8,239,836 | B1* | 8/2012 | Franz | G06F 21/52 717/127 |
| 2008/0280593 | A1* | 11/2008 | Savagaonkar | G06F 21/52 455/411 |
| 2009/0249289 | A1* | 10/2009 | Akritidis | G06F 11/3612 717/108 |
| 2015/0039863 | A1* | 2/2015 | Chiao | G06F 8/4436 712/220 |
| 2016/0132428 | A1* | 5/2016 | Gschwind | G06F 8/43 711/171 |
| 2016/0259682 | A1* | 9/2016 | Stark | G06F 11/073 |
| 2016/0274810 | A1* | 9/2016 | Godard | G06F 9/00 |
| 2017/0177368 | A1* | 6/2017 | DeHon | G06F 12/1408 |
| 2020/0210161 | A1* | 7/2020 | Portela Parente | G06F 8/433 |
| 2022/0108003 | A1* | 4/2022 | Kasatkin | G06F 21/12 |
| 2022/0179947 | A1* | 6/2022 | Ekberg | G06F 21/556 |

OTHER PUBLICATIONS

Periklis Akritidis, Cristian Cadar, Costin Raiciu, Manuel Costa and Miguel Castro, "Preventing memory error exploits with WIT", May 28, IEEE, pp. 263-277 (Year: 2008).*

* cited by examiner

*Primary Examiner* — Courtney P Spann
(74) *Attorney, Agent, or Firm* — Schwegman Lundberg & Woessner, P.A.

(57) ABSTRACT

System and techniques for tag checking procedure calls include specifying a value for a color in a program-counter relative (PC-relative) call instruction from a call site to a call target. A pointer is provided to steer the PC-relative call instruction to the call target based on the color. A function call is generated to the call target based on the pointer. Other systems, methods and apparatuses are also described.

24 Claims, 13 Drawing Sheets

TAG CHECKING PROCEDURE CALLS

TECHNICAL FIELD

Embodiments described herein generally relate to memory integrity and memory corruption and more specifically to preserving memory integrity in procedure calls.

BACKGROUND

Edge computing comprises data and computing infrastructure located closer to requestors to achieve very low latencies and high bandwidths typical of many demanding, emerging usages including those in 5G and 6G cellular networks. Edge computing may, in some scenarios, provide a cloud-like distributed service that offers orchestration and management for applications among many types of storage and compute resources. As a result, some implementations of edge computing have been referred to as the "edge cloud" or the "fog", as powerful computing resources previously available only in large remote data centers are moved closer to endpoints and made available for use by consumers at the "edge" of the network.

Edge computing and related have led to limitations and concerns with orchestration, functional coordination, and resource management, especially in complex mobility settings where many participants (devices, hosts, tenants, service providers, operators) are involved. In a similar manner, Internet of Things (IoT) networks and devices are designed to offer a distributed compute arrangement, from a variety of endpoints. IoT devices are physical or virtualized objects that may communicate on a network, and may include sensors, actuators, and other input/output components, which may be used to collect data or perform actions in a real world environment. For example, IoT devices may include low-powered endpoint devices that are embedded or attached to everyday things, such as buildings, vehicles, packages, etc., to provide an additional level of artificial sensory perception of those things. Recently, IoT devices have become more popular and thus applications using these devices have proliferated.

The deployment of various Edge, Fog, and IoT networks, devices, and services have introduced a number of advanced use cases and scenarios occurring at and towards the edge of the network. However, these advanced use cases have also introduced a number of corresponding technical challenges relating to security, processing and network resources, service availability and efficiency, among many other issues, especially as more types of computing systems and configurations are deployed. One such challenge is in relation to memory integrity and memory corruption, whether by malicious attackers or accidentally during system design.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1A:
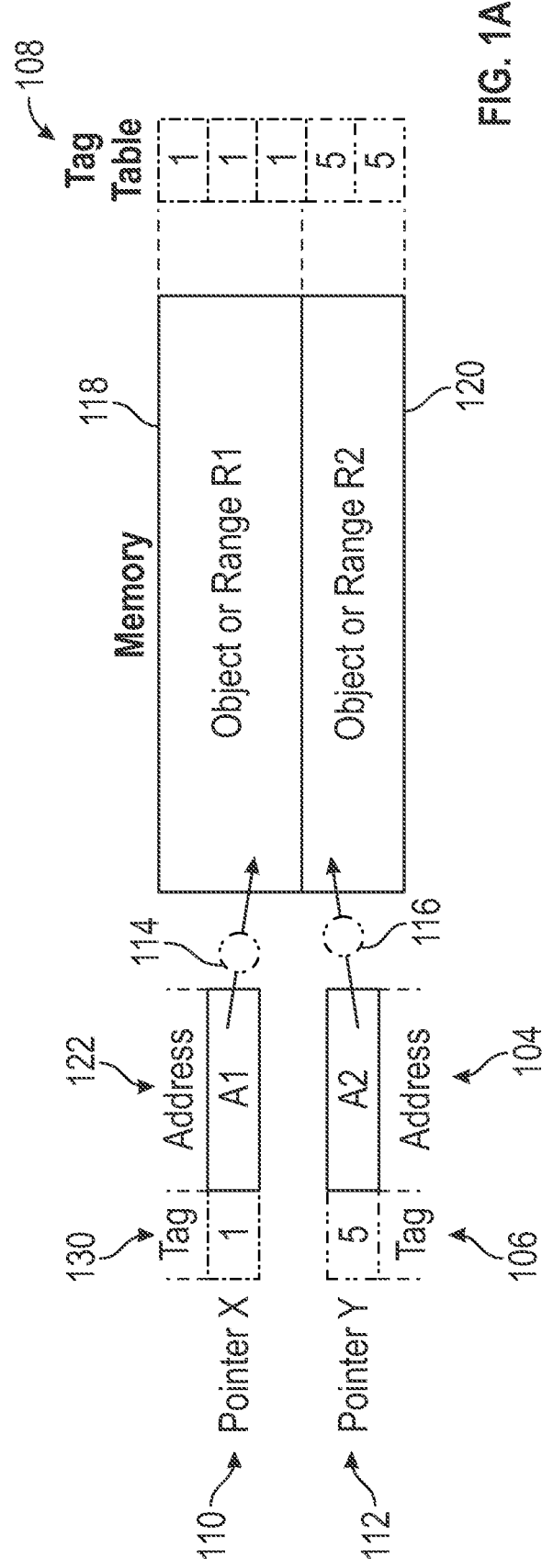
FIGS. 1A-1D illustrate an example of tagging objects in memory, according to memory tagging technology.
Figure 1B:
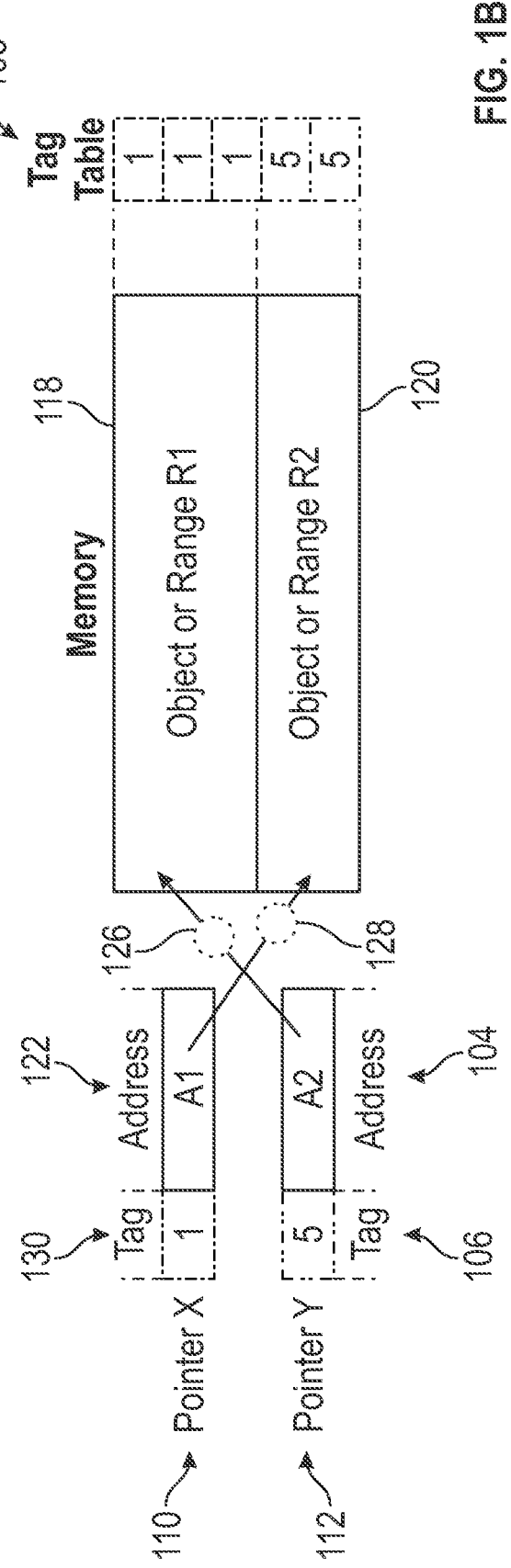

Networked access, such as is typical in edge computing—may be prone to attacks by malicious entities. These attacks can be manifested in memory corruption that can affect access to and use of a system or network. Memory corruption, either accidental or intended, is a significant source of bugs and attacks. Memory corruption vulnerabilities, such as buffer overflows, can threaten software applications written in memory-unsafe programming languages such as C or C++. These vulnerabilities can be exploited to overwrite data in program memory. By overwriting control data, such as code pointers and return addresses, attackers can redirect program execution to attacker-chosen or attacker-controlled locations.

Software and hardware techniques have been used to trap instances when memory is accessed or modified incorrectly and to enforce that memory is accessed or modified only by valid entities. Some techniques can help prevent such overwriting of control data by verifying that the target of a code branch taken from a source location of the branch is a valid branch target. These and other techniques can include a hardware based shadowing of call branches to ensure that returns from called procedures are in accordance with the contents of the shadow return address. However, if such techniques are circumvented, once an attacker manages to get a call diverted from a legitimate callee to the attacker, that attacker can do massive damage while remaining undetected by the network or system owner. For example, the attacker can insert malicious code in place of the original code as the call target and choose to subvert detection.

Other available techniques use metadata incorporated into memory pointers to verify, in hardware itself, that a pointer is pointing to valid data. However, these techniques still do not address call circumvention because these techniques are concerned with verification of data loading and storing, but not with verification of procedure calls. Techniques for verifying pointers can be expanded to verification of a subset of calls, where this subset comprises calls in which caller-callee correspondence is known at compile or link time. However, to improve security and reduce or eliminate malicious function calls, embodiments as described herein expand upon this subset of calls to include calls in which the caller-callee correspondence is established at load or during runtime from the actions of a loader, a dynamic library linker, or dynamic runtime loader. Systems, apparatuses and methods according to various embodiment help achieve safe cross-domain procedure calling within a shared address space as can be commonly found in network applications, edge computing systems and IoT networks that share common address spaces for lightweight microservices. Embodiments can pertain to ensuring that code is non-buggy and pointers across domains or boundary calls are not being malformed. Boundaries in the context can be between modules, or between sandboxes in a program boundary that can be between privileged levels in a program.

Available solutions can include software-based solutions for verifying procedure calls across domains or boundaries. Software-based solutions work by creating sandboxes that impose a strict discipline on which software modules can call which other software modules, and hijacking of control is prevented by these predefined sandboxing boundaries. A potential attacker is limited by inter-module boundaries from calling functions within a different module. Software defenses against run-time attacks can offer strong security guarantees, but the usefulness of software-based solutions is limited by high performance overhead, or by requiring significant changes to system software architecture.

Systems, apparatuses and methods according to embodiments address memory corruption concerns by providing tag-checking (as defined later herein) in intra-module procedure calls. In some embodiments, in addition to or instead of providing tag-checking of intra-module procedure calls, location machinery is engineered through a program linkage table (PLT) to complete the end-to-end tag check from a caller in one module to a callee in a second module. In some systems, apparatuses and methods according to embodiments, a tag (e.g., "color field") is imbedded into a PC-relative call instruction's op-code, either directly or as contained in a register operand. This imbedding can be done through a privileged constructor such as a trusted compiler or a trusted assembler. When a call instruction is seen that includes a non-default color field value, the color field value is verified against a color table according to color verification algorithms. The approach provides a non-complex, lightweight, and time-efficient method of building on available techniques for tag checking of data loading and storing operations without intruding into instruction-level parallelism. Extensions are provided for CALL and MOV instructions. Backward compatibility can be maintained through the use of function prototype overloading, default colors (e.g., "transparent" colors), etc.

Memory tagging technology (MTT) can be used for checking that a pointer addresses a memory that is valid for that pointer to address. Other related technologies can be hardware or software based and can check integrity of load and store operations based on hardware protection keys etc. MTT involves low or reduced hardware complexity and adds less performance overhead than other techniques, and can be backward compatible with existing techniques to resist software attacks. Systems, methods and apparatuses according to embodiments can build on and improve MTT to extend MTT to verifying of procedure calls without impeding either branch prediction or out-of-order execution. In addition, systems, apparatuses and methods according to embodiments can be used at the same time as other, non-MTT-based pointer integrity checking mechanisms.

Figure 1C:
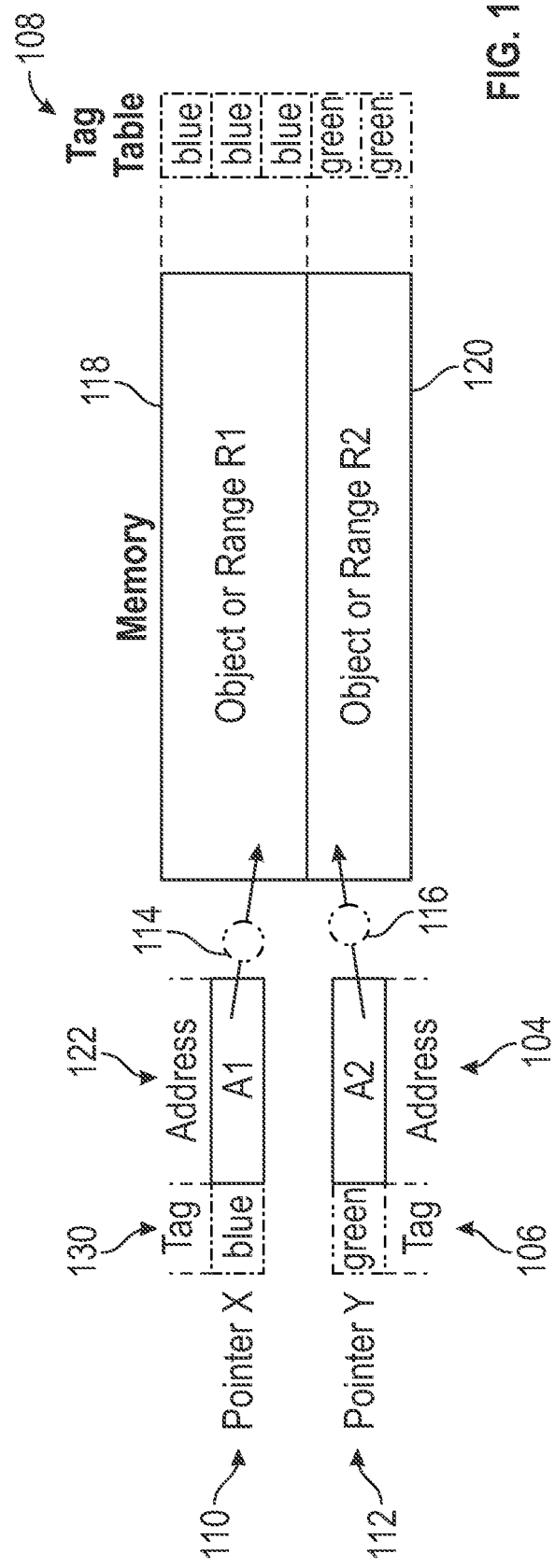
Figure 1D:
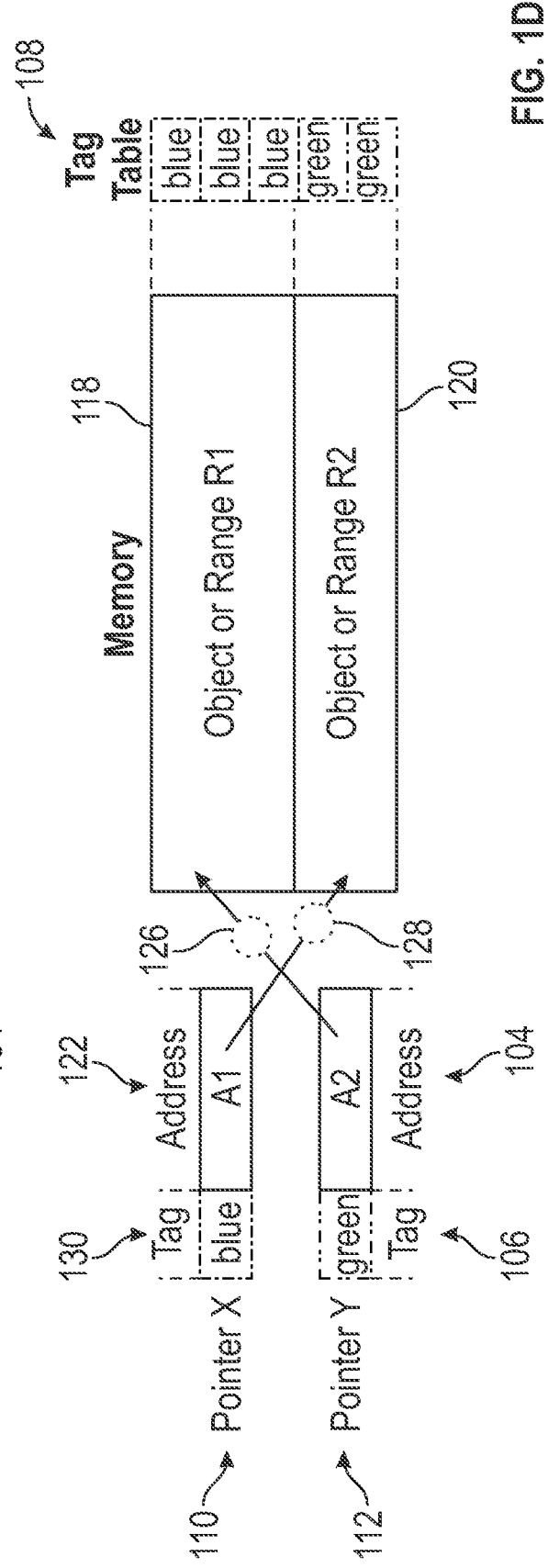

FIGS. 1A-1D illustrate an example of tagging objects in memory, according to memory tagging technology. The examples of FIGS. 1A-1D provide a high-level representation of MTT operation that has been used in computer science previously, and is still used today in some contexts. In MTT, a small number of bits 130 in the upper bits of a first virtual address 122 are overloaded with a tag (e.g., "color," although other similar concepts for distinguishing could be contemplated), and these bits are treated as 0 for the purpose of address translation otherwise. Other virtual addresses 104 can be similarly overloaded with other tags 106. A hardware structure 108 called a tag table can encode a color, for each tile in virtual memory that corresponds to that respective tile's color. In this manner, thus a section of memory 118, 120 that has been tagged with a color (e.g., blue or green), for example, can only be pointed to by a pointer that has been tagged with that respective color 110, 112, as shown in FIGS. 1A and 1C. For example, referring to both FIGS. 1A and 1C, pointer 110 can only point (shown by arrow 114) to memory 118 that has been encoded as "blue." Similarly, pointer 112 can only point (shown by arrow 116) to memory 120 that has been encoded as green. As a result, pointer arithmetic in memory unsafe languages can be performed in the lower parts of a pointer, but should a pointer become modified as a result of such arithmetic to stray across object boundaries, hardware detects the mismatch between the pointer's color and that of the new object into which it has strayed. For example, referring to FIGS. 1B and 1D, pointer 110 cannot point to memory 120 that has been encoded as green; likewise, pointer 112 cannot point to memory 118 that has been encoded as blue. Hardware will detect (see e.g., arrows 126, 128) a mismatch and not allow access by the wrong pointer 110, 112 to a differently-coded memory portion 118, 120. Example embodiments, in a sense, expand the concept of MTT to prevent function calls to functions by unauthorized other function calls, computer programs, etc., by tagging function pointers with similar colors, as described later herein.

Pointer integrity checking can be leveraged by extending a processor's hardware implementation. A call from a caller site X to a callee Y, wherein X and Y are in the same compile or link unit U1 (i.e., the relative address of X to Y is fixed independent of where U1 exists in the address space), is protected as follows. Suppose that Y is associated with a color tag of value in a configuration file. It is common for such invocations (X→Y) to be program-counter relative (PC-relative) for both efficiency of encoding and for not being sensitive to the base address of where U1 208 gets loaded. Systems, apparatuses and methods according to embodiments provide a variant of PC-relative call instruction encoding that specifies the color.

A compiler can use a coloring or other tagging mechanism or identifying mechanism specified in a color.h file (e.g., a header file for defining variables, function prototypes, etc.) for each of the call targets (e.g., call target Y). The instruction producing the PC-relative call at site X can use one of at least three alternatives for steering the call at X. In a first alternative, the fixed immediate operand can be encoded for the relative distance (Y–X). In a second alternative, a relative distance value can be taken (e.g., read from) from a general purpose register (GPR) that carries the relative distance (Y–X). In a third alternative, a memory location m can store that relative distance. In any alternative, the valid color for objects of color can be encoded in the call instruction itself. A memory based attacker that seeks to hijack the call at a site can only hijack that call in the third alternative, by substituting a rogue value in location memory location m. However, the attacker will not have a way to simultaneously alter the color table in the color.h header file, and therefore the attacker cannot prevent processing circuitry from verifying that the call is going to object of color w.

Embodiments can be compatible with available systems with little or no added complexity for developers, compiler systems, or hardware circuitry. A source code developer shall provide a color.h file at compile time that specifies and defines colors (or tag parameters). If no colors or other tag parameters are provided, an overloaded version of the appropriate function can be used in which the function prototype does not specify any color or other tag parameter, or in which a default color can be specified (e.g., "transparent" color is provided). Processing circuitry shall check, at any point in the instruction flow for the called function, that the embedded tag matches the color tag in the static data that is created in the read-only portion of the address space. The address space can be assumed as non-corrupted because such corruption could only occur by an attack on page tables, which is not possible unless the attacker can obtain the system privilege for accessing the page tables. On the other hand, if the page tables are corrupted, there can be no protection because the page table protection itself has been compromised. The translations to those pages are themselves read-protected, so an attacker would not only have to be running inside the operating system (or a hypervisor, in the case of a virtualized system), but the attacker must also have managed to take control of those modules that form the hardware address translation (HAT) layer or overwrite that entire section of the operating system. These later types of "rootkit" attacks are outside the scope of the present disclosure.

Embodiments can also be used in indirect function calls within a same unit U1. In an example, indirect calls can be of the format Func1(*function-pointer, . . . ), wherein function-pointer is assigned a dynamic value that is an address of some other function, and where that function is called indirectly through the pointer and is part of the same relocatable unit as the function pointer variable. In at least these example embodiments, the function-pointer variable is a tagged pointer, and the tag value is consistent with the color assigned to the code object at the address to which the tagged pointer refers. A call-indirect instruction can only be hijacked by setting the location in the function-pointer with the address of the rogue function to steer the call to a different (e.g., "rogue") function than that meant by the software developer. However, because the compiler has access to the function prototype information for the contents of the function-pointer, if the color (e.g., tag parameter) of a function foo( ) is included in the declaration of the function prototype (and thus in the prototype of a pointer to foo) the compiler has the information it needs to wire in the color into a call-indirect instruction at the call site.

In the above manner, processing circuitry (whether indirectly or directly) can enforce a tag parameter or color match against a color table by virtue of the corresponding function's prototype being of the correct or expected color. Further, processing circuitry can keep the machine front-end (where instructions are decoded, branches are predicted and steered-to) mostly unchanged simply by auto-inserting a preceding micro-operation (UOP) for a call operation, that emulates a "load" of that call-target with the color contained in the call instruction. This ensures that any attempt to hijack that call (or a programming bug that erroneously calls a function) falls under the shadow of that preceding load micro-operation and is therefore nullified later when the load throws an exception. Programmer burden is reduced because the programmer need only add information into a color.h header file. Furthermore, a programmer can provide polymorphic calls if desired to allow the same calling site to perform calls to functions of more than one color. The compiler can issue a null color for such calls (where the prototype is of a void, "transparent" or variable color), and let the programmer take responsibility for ensuring that such polymorphic calls are not hijacked. For example, the function-pointer may point to a wrapper function, and within that wrapper function, the programmer can do color-specific indirect calls.

Figure 2A:
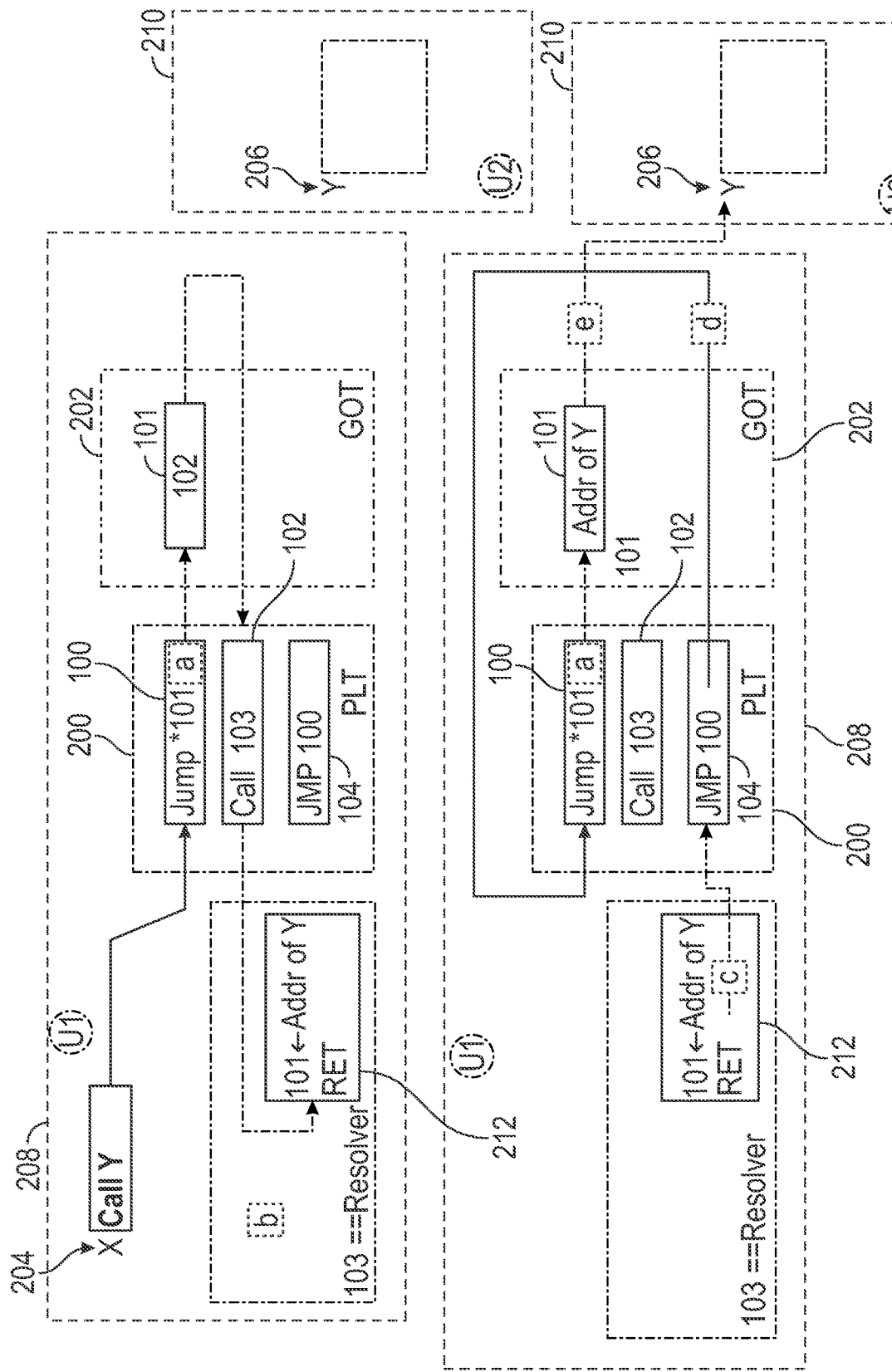
FIG. 2A illustrates an example of a program linkage table (PLT) and global offset table (GOT)-mediated call in a first invocation of a function, according to an embodiment.
Figure 2B:
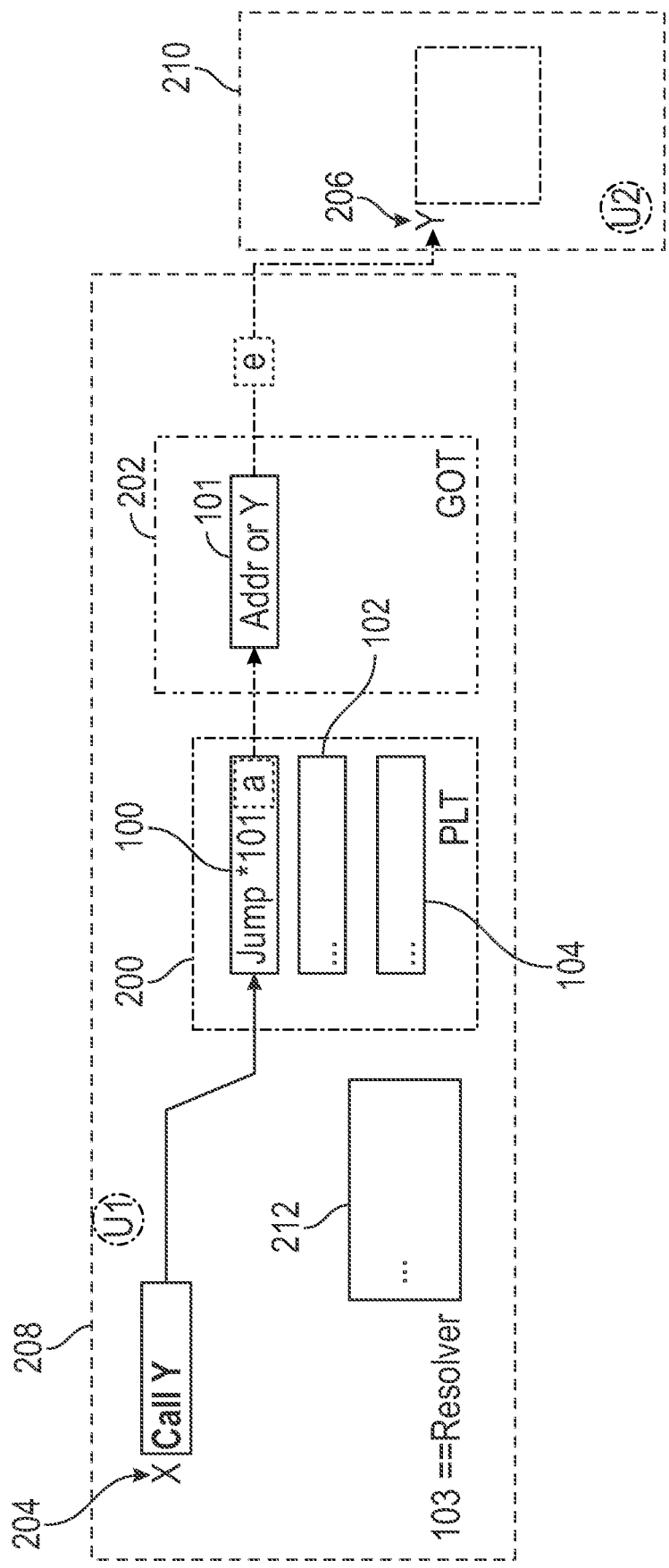
FIG. 2B illustrates an example of a PLT- and GOT-mediated call in any subsequent invocation of the function of FIG. 2A, according to an embodiment.

FIG. 2A illustrates an example of a PLT 200 and GOT 202 mediated call in a first invocation of a function, according to an embodiment. FIG. 2B illustrates an example of a PLT 200 and GOT 202 mediated call in any subsequent invocation of the function of FIG. 2A, according to an embodiment. PLT 200 and GOT 202 can be used for steering calls across units U1 208 and U2 210 whose address space placements in relation to each other are determined at run time.

In FIG. 2A, the call to Y 206 at compile time is unresolved, and maps to a set of instructions in the PLT 200. A GOT 202 corresponding to target Y 206 is a location shown as 101 in FIG. 2A. In the top part of FIG. 2A, a first call to Y 206 comes through the PLT 200, whose first instruction at 100 (shown as operation (a)) causes it to indirect through the GOT 202 back into the next instruction at location 102 in the PLT 200. That location contains a call to a resolver at location 103 (shown as operation (b)).

Next in the bottom part of FIG. 2A the result of operation (b) from above is to update the writable location 101 in the GOT 202 with the address of Y 206. In operation (c), the resolver 212 returns to a next instruction at location 104 in the PLT 200; shown as operation (d), this is a static jump back to PLT 200 at location 100. When the indirect jump in location 100 is performed now, in operation (e), the GOT 202 steers the program counter to Y 206 because the address of Y 206 was filled in by the resolver 212 into location 101 in operation (b) earlier. It will be noted that the call frame at this point is set up to return from Y directly to the next call instruction after 204 in the original caller, since the intermediate call at location 102 has already been returned-to at location 104.

Thus the jump via locations 100, 104, and 100 again loops in a call to resolver 212 the first time that a caller 204 in U1 208 calls Y 206 in U2 210. This sequence also updates the only mutable location 101 which is in the writable GOT 202, to replace its contents from 102 previously, to now include the address of Y 206. Therefore, subsequent calls to Y 206 from X 204 or from any other caller in U1 208, are directly transmitted to Y 206 through the indirect address at location 101 in the GOT 202 as shown in FIG. 2B. PLT 202 is immutable, but GOT 202 is not, and therefore the primary concern is to ensure that tag checking protects against the hijack of the GOT 202 region.

Operation (a) in FIG. 2A and FIG. 2B can be preceded by a PC-relative call within U1 208. Similarly, the call at location 102 in FIG. 2A is covered by the tag-checking technique for a PC-relative call. What remains then is to ensure color integrity (e.g., the expected or correct "color" or tag is present in the function pointer) when a call goes between two units or modules U1 and U2. In other words, if somehow the location 101 gets hijacked and filled in with the address of a rogue callee, the call should fail either in FIG. 2A for a first call or FIG. 2B for any subsequent calls to Y 206.

As an initial matter, it could be possible to tag check non-call branches, in the same way that one might tag check PC-relative calls and/or absolute calls through a memory pointer, by treating any transfer of control to a target code address for tag match. However, this is not desirable for at least the reasons provided below.

First, branch instructions of all types are very frequent (roughly one in five instructions is a branch instruction), and solutions already are provided through branch prediction and efficient front-end-steering, and complexity would increase immensely if this work were re-done for all transfer of control to a target code. Further performance issues and compiler heuristic issues would make such a change non-trivial.

Second, it would not be possible to only tag check unconditional indirect branches, because in some cases conditional branches can be reduced to unconditional or indirect branches. Third, unconditional or conditional indirect branches are a commonly used technique for translating object oriented and/or polymorphic code. Injecting tag parameters or colors into such schemes would create very fine-grained color tables to cover object nesting and aggregation or disaggregation, inheritance, etc. This would make such color tables and their implementation very complex and challenging. The threat of an attacker targeting a location in writable memory through which a non-call branch may transit at some unknown time and in spite of techniques like address space layout randomization (ASLR) is not sufficiently serious to vindicate such enormous increase in complexity. Further, such protection is easily obtained by tag checking selectively on the memory location itself so that an attacker cannot write memory by simply provoking a stack overrun (i.e., protecting contents of memory for loads/stores). Therefore a generic solution such as tag checking all branches, or even all unconditional indirect branches, over solves and overcomplicates a problem that can be solved by judiciously applying tag checking for loads and stores. For example, a compiler can easily avoid an unconditional branch via memory as follows: instead of emitting an instruction like jump *foo (where foo is a dynamically updated memory location) the compiler can perform an operation such as: mov *foo rax, jump *rax, which causes hardware to tag check only the mov operation. Note that the instructions themselves are not in writable memory, so there is little an attacker can do once the compiler has eliminated the problem by this simple construction.

Given the above, systems, methods and apparatuses according to embodiments provide changes to the resolver (specifically block 103 of resolver 212). The resolver 212 in block 103 in FIG. 2A and FIG. 2B first performs a load on the call target Y 206 in U2 210. To do that, the resolver 212 takes the color $\psi$ (e.g., tag parameter) from the color table (which is in a read-only global area) and constructs a pointer with that color $\psi$ in the high order virtual bits, in a GPR such as for example a "long" size (e.g., 64-bit) register (e.g., "rax"). The resolver 212 then touches (e.g., reads) the code address Y, and by so doing the resolver 212 verifies that Y 206 has the right color as the color $\psi$ with which the compiler created the CALL instruction at address X 204 in unit U1 208.

For interoperability with legacy code where Y 206 may be uncolored, for example because Y 206 is from a library that predates the implementation of tag-checking, no color for Y 206 may be available. To support such mixing of code units (like U1 208) that employ color checking and code units (like U2 210), systems and methods according to embodiments can provide a color override bit or a transparent-color T. Thus at compile time for the code in U1 208, the compiler would have emitted color T in place of color $\psi$ because a configuration file would have provided no color for the call target Y 206.

Once the resolver 212 has verified that the callee address 206 has the same color (whether $\psi$ or T in the example) as that with which the caller at site X 204 had called the PLT 200 stub, the GOT 202 location 101 is to be verified against hijacking, e.g., a call to the call target is to be sourced form an authorized call site. Because the location 100 in the PLT 200 is just an indirect jump, subsequent calls need to be protected against hijacking as well. Methods according to embodiments resolve this as shown in FIG. 2B. Referring now to FIG. 2B, the PLT 200 stub at 100 is changed at operation a by blending the color ($\psi$/T) into a synthesized pointer in a register with the contents of 101, into a register based pointer. Then the PLT 200 stub touches (reads) the target address. These two instructions (constructing the colored pointer to Y from contents of 101 and touching them) before performing the indirect jump are all in unmodifiable memory, and are emitted by the compiler (not done at resolution time) and therefore not subject to hijacking. If the hijacker overwrites 101 in the GOT 202 after the resolver 212 has created the target address Y there, then the PLT 200 stub at location 100 exposes that hijack.

Figure 3:
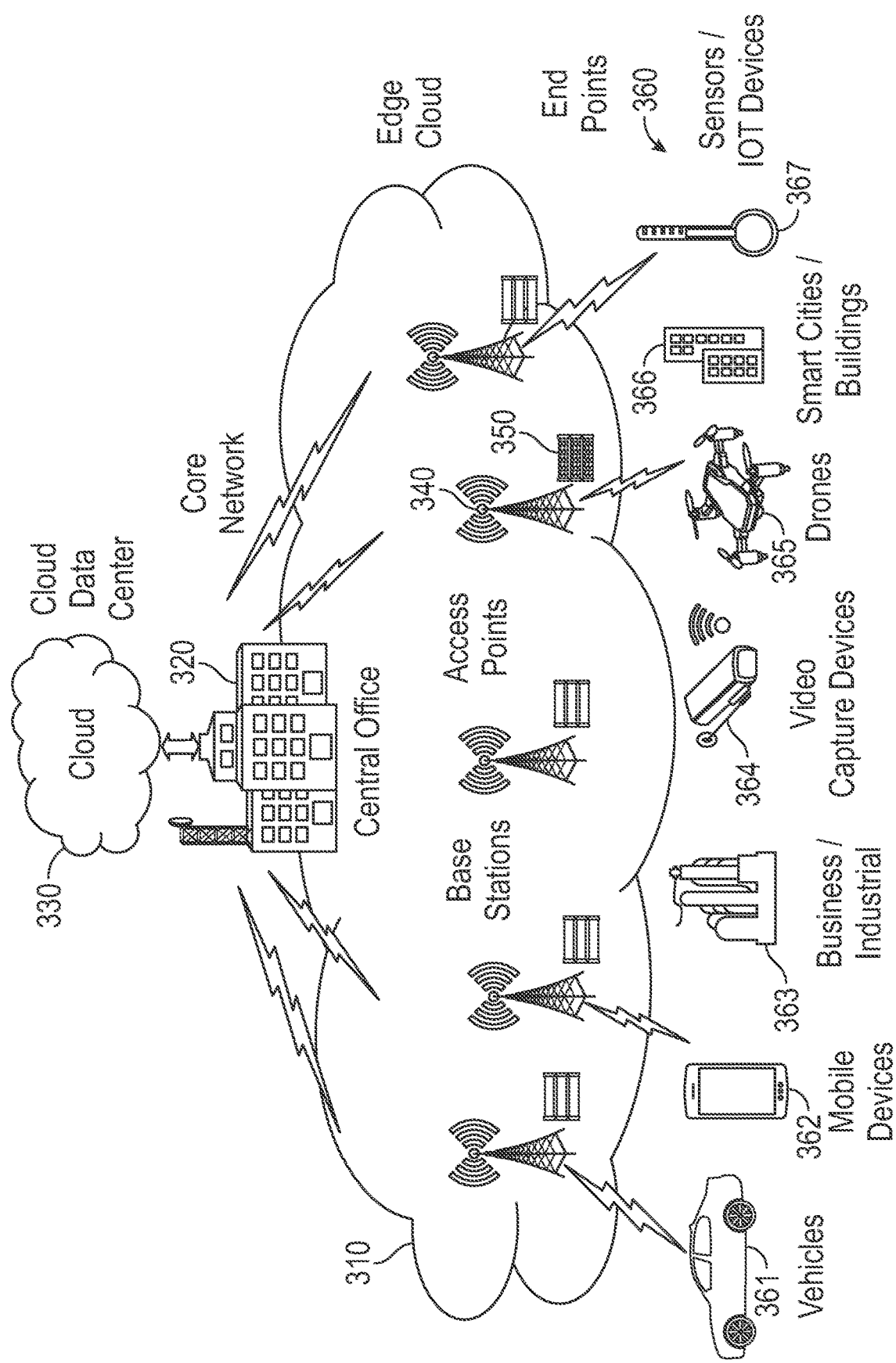
FIG. 3 illustrates an overview of an edge cloud configuration for edge computing.

FIG. 3 is a block diagram showing an overview of a configuration for edge computing, which includes a layer of processing referred to in many of the following examples as an "edge cloud". As shown, the edge cloud 310 is co-located at an edge location, such as an access point or base station 340, a local processing hub 350, or a central office 320, and thus may include multiple entities, devices, and equipment instances. The edge cloud 310 is located much closer to the endpoint (consumer and producer) data sources 360 (e.g., autonomous vehicles 361, user equipment 362, business and industrial equipment 363, video capture devices 364, drones 365, smart cities and building devices 366, sensors and IoT devices 367, etc.) than the cloud data center 330. Compute, memory, and storage resources which are offered at the edges in the edge cloud 610 are critical to providing ultra-low latency response times for services and functions used by the endpoint data sources 660 as well as reduce network backhaul traffic from the edge cloud 610 toward cloud data center 630 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 4:
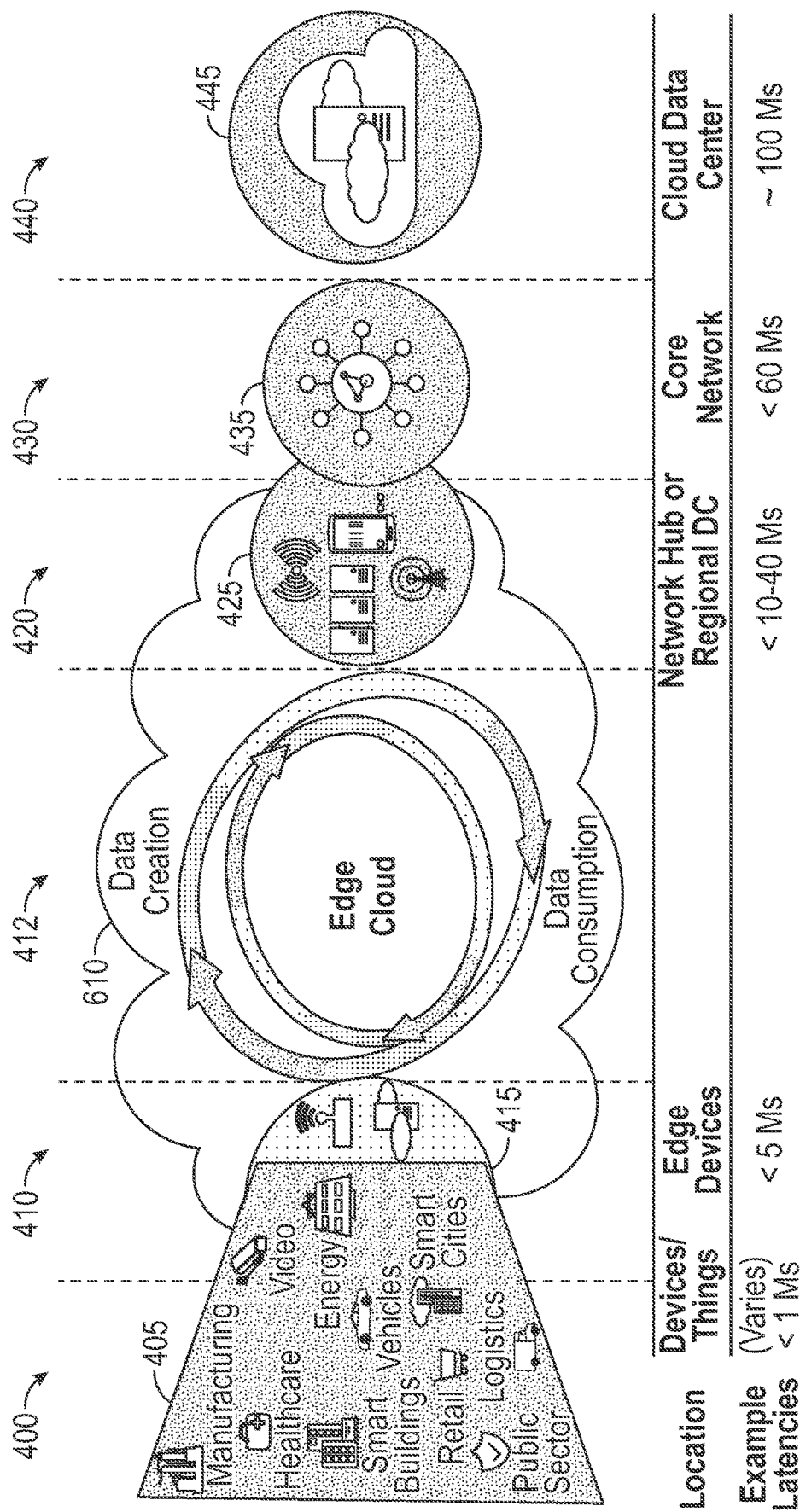
FIG. 4 illustrates operational layers among endpoints, an edge cloud, and cloud computing environments.

FIG. 4 illustrates operational layers among endpoints, an edge cloud, and cloud computing environments. Specifically, FIG. 4 depicts examples of computational use cases 405, utilizing the edge cloud 610 among multiple illustrative layers of network computing. The layers begin at an endpoint (devices and things) layer 400, which accesses the edge cloud 610 to conduct data creation, analysis, and data consumption activities. The edge cloud 610 may span multiple network layers, such as an edge devices layer 410 having gateways, on-premise servers, or network equipment (nodes 415) located in physically proximate edge systems; a network access layer 420, encompassing base stations, radio processing units, network hubs, regional data centers (DC), or local network equipment (equipment 425); and any equipment, devices, or nodes located therebetween (in layer 412, not illustrated in detail). The network communications within the edge cloud 610 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 400, under 5 ms at the edge devices layer 410, to even between 10 to 40 ms when communicating with nodes at the network access layer 420. Beyond the edge cloud 610 are core network 430 and cloud data center 440 layers, each with increasing latency (e.g., between 50-60 ms at the core network layer 430, to 100 or more ms at the cloud data center layer). As a result, operations at a core network data center 4354 or a cloud data center 445, with latencies of at least 50 to 100 ms or more, will not be able to accomplish many time-critical functions of the use cases 405. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 435 or a cloud data center 445, a central office or content data network may be considered as being located within a "near edge" layer ("near" to the cloud, having high latency values when communicating with the devices and endpoints of the use cases 405), whereas an access point, base station, on-premise server, or network gateway may be considered as located within a "far edge" layer ("far" from the cloud, having low latency values when communicating with the devices and endpoints of the use cases 405). It will be understood that other categorizations of a particular network layer as constituting a "close", "local", "near", "middle", or "far" edge may be based on latency, distance, number of network hops, or other measurable characteristics, as measured from a source in any of the network layers 400-440.

The various use cases 405 may access resources under usage pressure from incoming streams, due to multiple services utilizing the edge cloud. To achieve results with low latency, the services executed within the edge cloud 610 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 610 may provide the ability to serve and respond to multiple applications of the use cases 405 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required because edge locations may be unmanned and may even need permissioned access (e.g., when housed in a third-party location). Such issues are magnified in the edge cloud 610 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 610 (network layers 400-440), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 610.

As such, the edge cloud 610 is formed from network components and functional features operated by and within edge gateway nodes, edge aggregation nodes, or other edge compute nodes among network layers 410-430. The edge cloud 610 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 610 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 610 may be servers, multi-tenant servers, appliance computing devices, or any other type of computing devices. For example, the edge cloud 610 may include an appliance computing device that is a self-contained electronic device including a housing, a chassis, a case, or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8B. The edge cloud 610 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code, or scripts.

Figure 5:
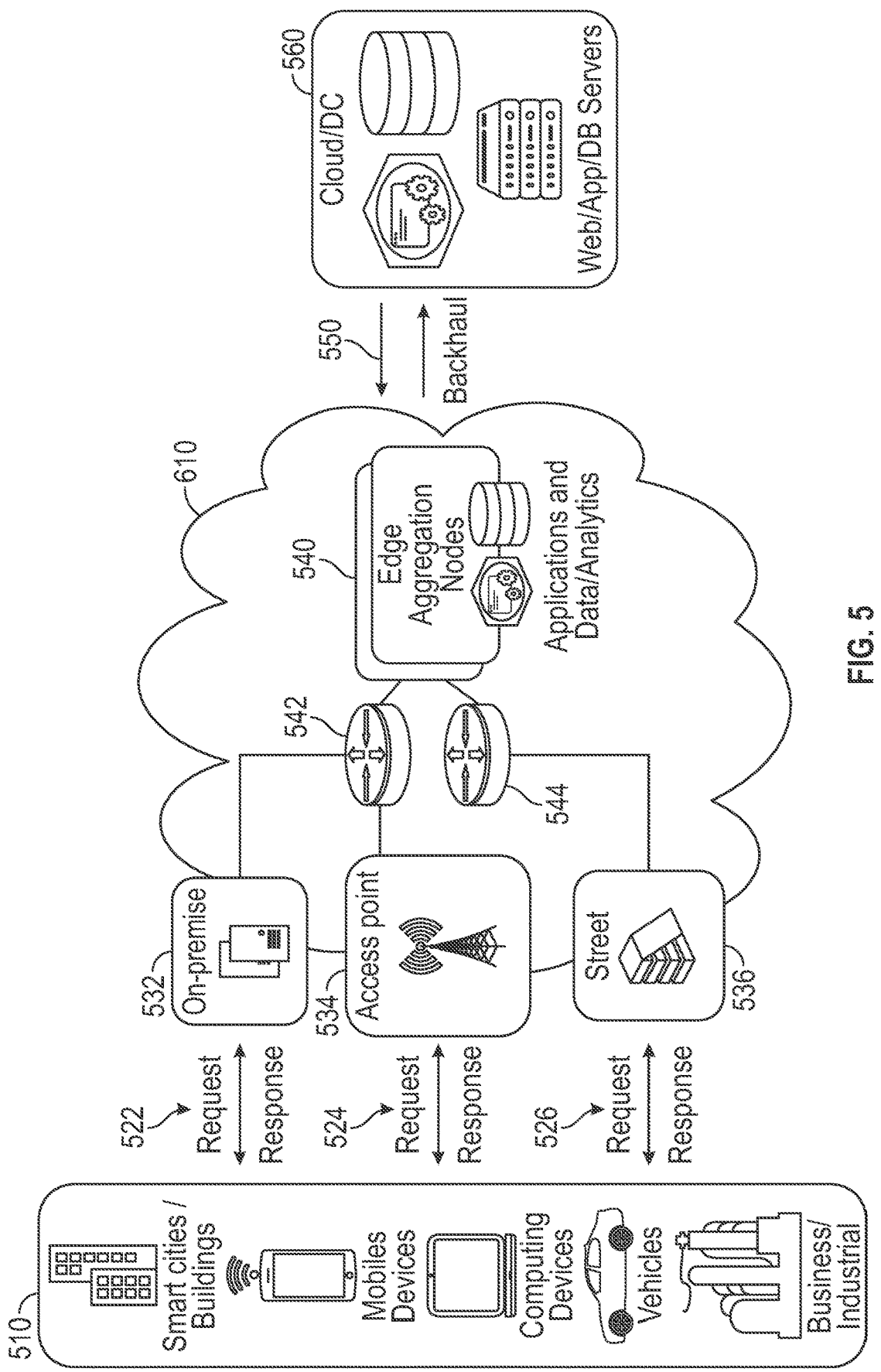
FIG. 5 illustrates an example approach for networking and services in an edge computing system.

In FIG. 5, various client endpoints 510 (in the form of mobile devices, computers, autonomous vehicles, business computing equipment, industrial processing equipment) exchange requests and responses that are specific to the type of endpoint network aggregation. For instance, client endpoints 510 may obtain network access via a wired broadband network, by exchanging requests and responses 522 through an on-premise network system 532. Some client endpoints 510, such as mobile computing devices, may obtain network access via a wireless broadband network, by exchanging requests and responses 524 through an access point (e.g., cellular network tower) 534. Some client endpoints 510, such as autonomous vehicles may obtain network access for requests and responses 526 via a wireless vehicular network through a street-located network system 536. However, regardless of the type of network access, the TSP may deploy aggregation points 542, 544 within the edge cloud 610 to aggregate traffic and requests. Thus, within the edge cloud 610, the TSP may deploy various compute and storage resources, such as at edge aggregation nodes 540, to provide requested content. The edge aggregation nodes 540 and other systems of the edge cloud 610 are connected to a cloud or data center 560, which uses a backhaul network 550 to fulfill higher-latency requests from a cloud/data center for websites, applications, database servers, etc. Additional or consolidated instances of the edge aggregation nodes 540 and the aggregation points 542, 544, including those deployed on a single server framework, may also be present within the edge cloud 610 or other areas of the TSP infrastructure.

Figure 6:
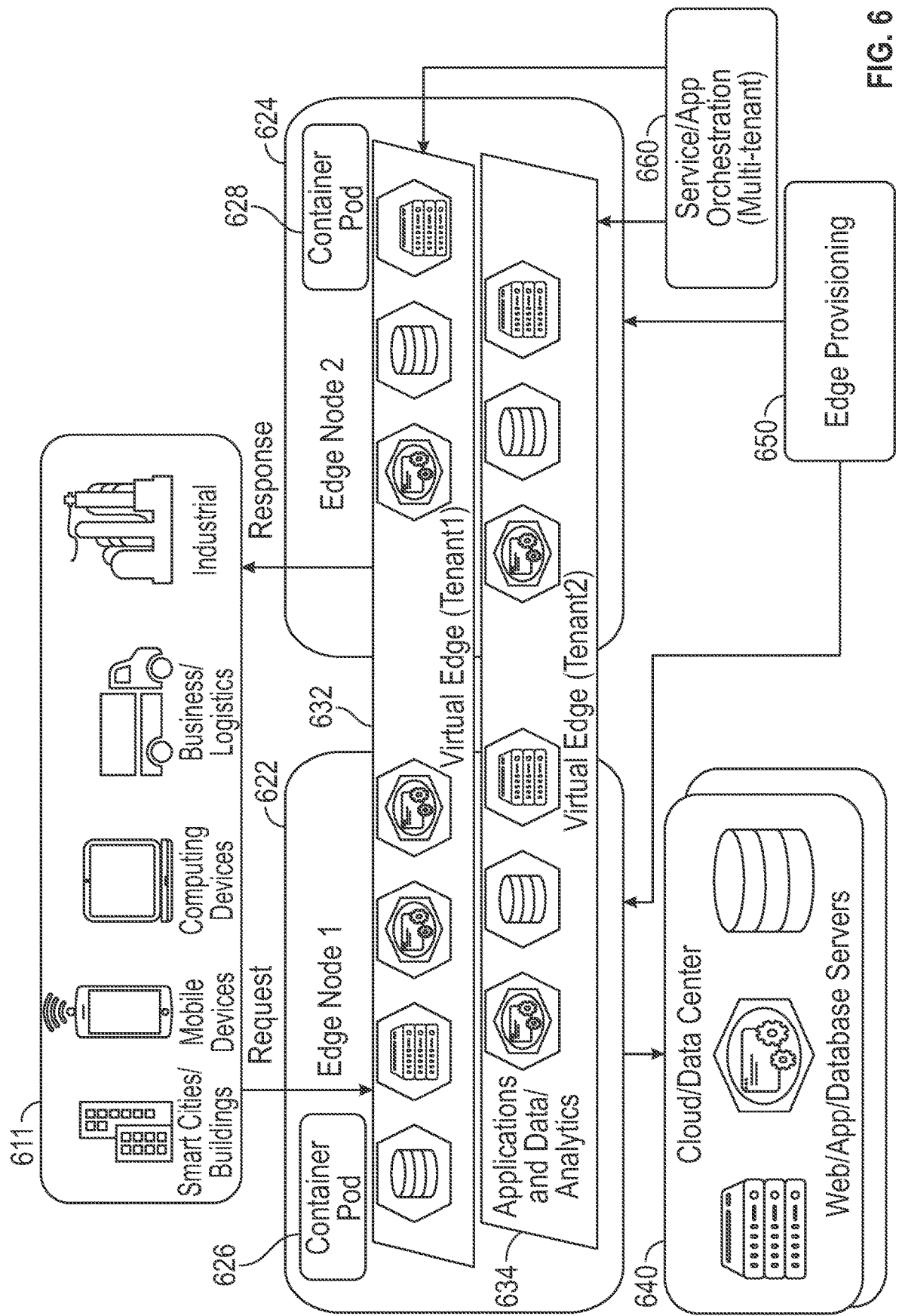
FIG. 6 illustrates deployment of a virtual edge configuration in an edge computing system operated among multiple edge nodes and multiple tenants.

FIG. 6 illustrates deployment and orchestration for virtualized and container-based edge configurations across an edge computing system operated among multiple edge nodes and multiple tenants (e.g., users, providers) which use such edge nodes. Specifically, FIG. 6 depicts coordination of a first edge node 622 and a second edge node 624 in an edge computing system, to fulfill requests and responses for various client endpoints 611 (e.g., smart cities/building systems, mobile devices, computing devices, business/logistics systems, industrial systems, etc.), which access various virtual edge instances. Here, the virtual edge instances 632, 634 provide edge compute capabilities and processing in an edge cloud, with access to a cloud/data center 640 for higher-latency requests for websites, applications, database servers, etc. However, the edge cloud enables coordination of processing among multiple edge nodes for multiple tenants or entities.

In the example of FIG. 6, these virtual edge instances include: a first virtual edge 632, offered to a first tenant (Tenant 1), which offers a first combination of edge storage, computing, and services; and a second virtual edge 634, offering a second combination of edge storage, computing, and services. The virtual edge instances 632, 634 are distributed among the edge nodes 622, 624, and may include scenarios in which a request and response are fulfilled from the same or different edge nodes. The configuration of the edge nodes 622, 624 to operate in a distributed yet coordinated fashion occurs based on edge provisioning functions 650. The functionality of the edge nodes 622, 624 to provide coordinated operation for applications and services, among multiple tenants, occurs based on orchestration functions 660.

It should be understood that some of the devices in 611 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 622, 624 may operate as security feature enforcement points for local resources allocated to multiple tenants per node. Additionally, tenant runtime and application execution (e.g., in instances 632, 634) may serve as an enforcement point for a security feature that creates a virtual edge abstraction of resources spanning potentially multiple physical hosting platforms. Finally, the orchestration functions 660 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 610, 622, and 640 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 6. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or respective computing systems and resources which are co-owned or co-managed by multiple owners).

For instance, each edge node 622, 624 may implement the use of containers, such as with the use of a container "pod" 626, 628 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 632, 634 are partitioned according to the needs of each container.

With the use of container pods, a pod controller oversees the partitioning and allocation of containers and resources. The pod controller receives instructions from an orchestrator (e.g., orchestrator 660) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 660 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute, and a different shared pod controller is installed and invoked prior to the second pod executing.

Figure 7:
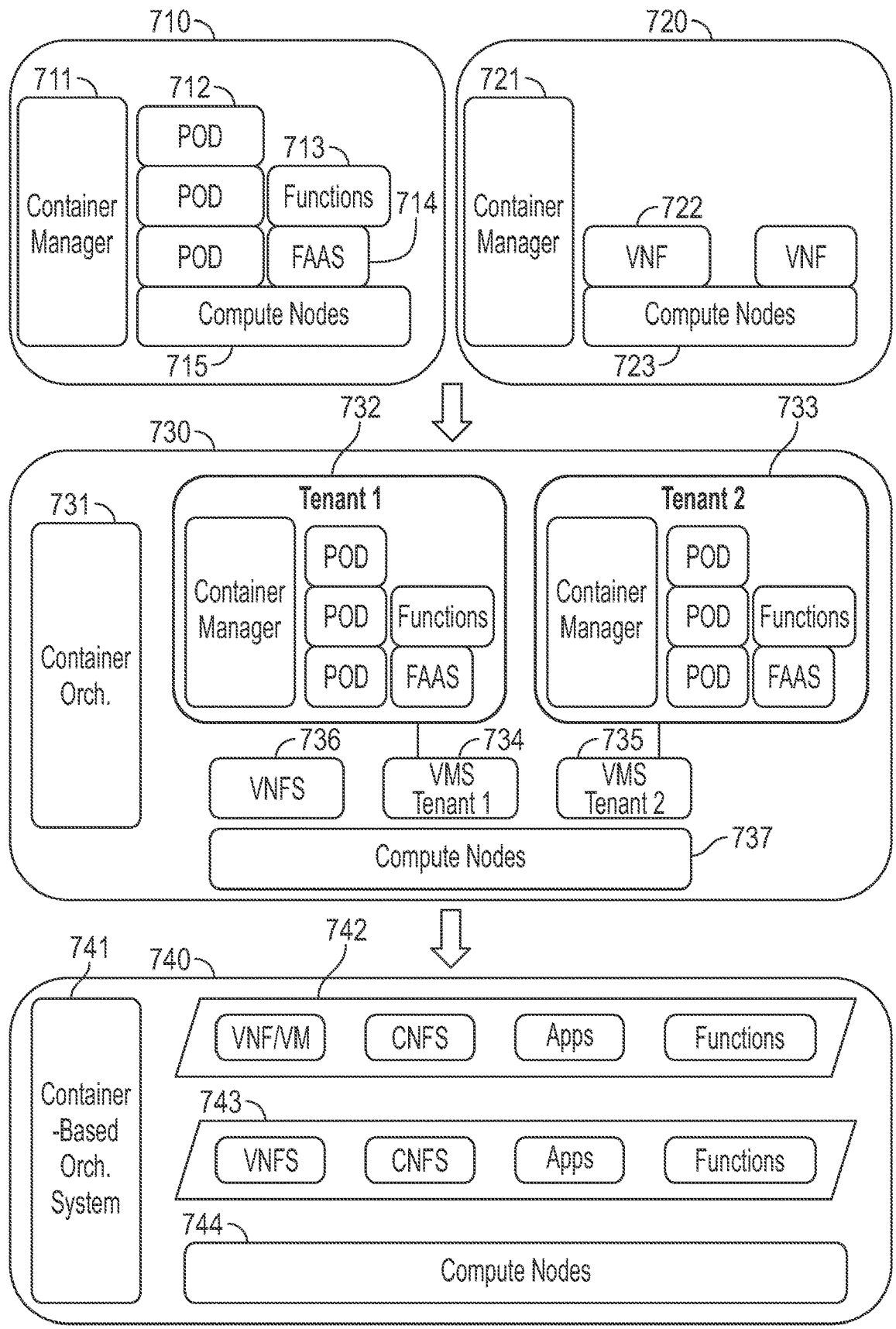
FIG. 7 illustrates various compute arrangements deploying containers in an edge computing system.

FIG. 7 illustrates additional compute arrangements deploying containers in an edge computing system. As a simplified example, system arrangements 710, 720 depict settings in which a pod controller (e.g., container managers 711, 721, and container orchestrator 731) is adapted to launch containerized pods, functions, and functions-as-a-service instances through execution via compute nodes (715 in arrangement 710), or to separately execute containerized virtualized network functions through execution via compute nodes (723 in arrangement 720). This arrangement is adapted for use of multiple tenants in system arrangement 730 (using compute nodes 737), where containerized pods (e.g., pods 712), functions (e.g., functions 713, VNFs 722, 736), and functions-as-a-service instances (e.g., FaaS instance 714) are launched within virtual machines (e.g., VMs 734, 735) for tenants 732, 733) specific to respective tenants (aside the execution of virtualized network functions). This arrangement is further adapted for use in system arrangement 740, which provides containers 742, 743, or execution of the various functions, applications, and functions on compute nodes 744, as coordinated by a container-based orchestration system 741.

The system arrangements of depicted in FIG. 7 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 7, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves, and hardware partitioning schemes may be used by edge owners to enforce tenancy. Other isolation environments may include bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 8A and 8B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8A:
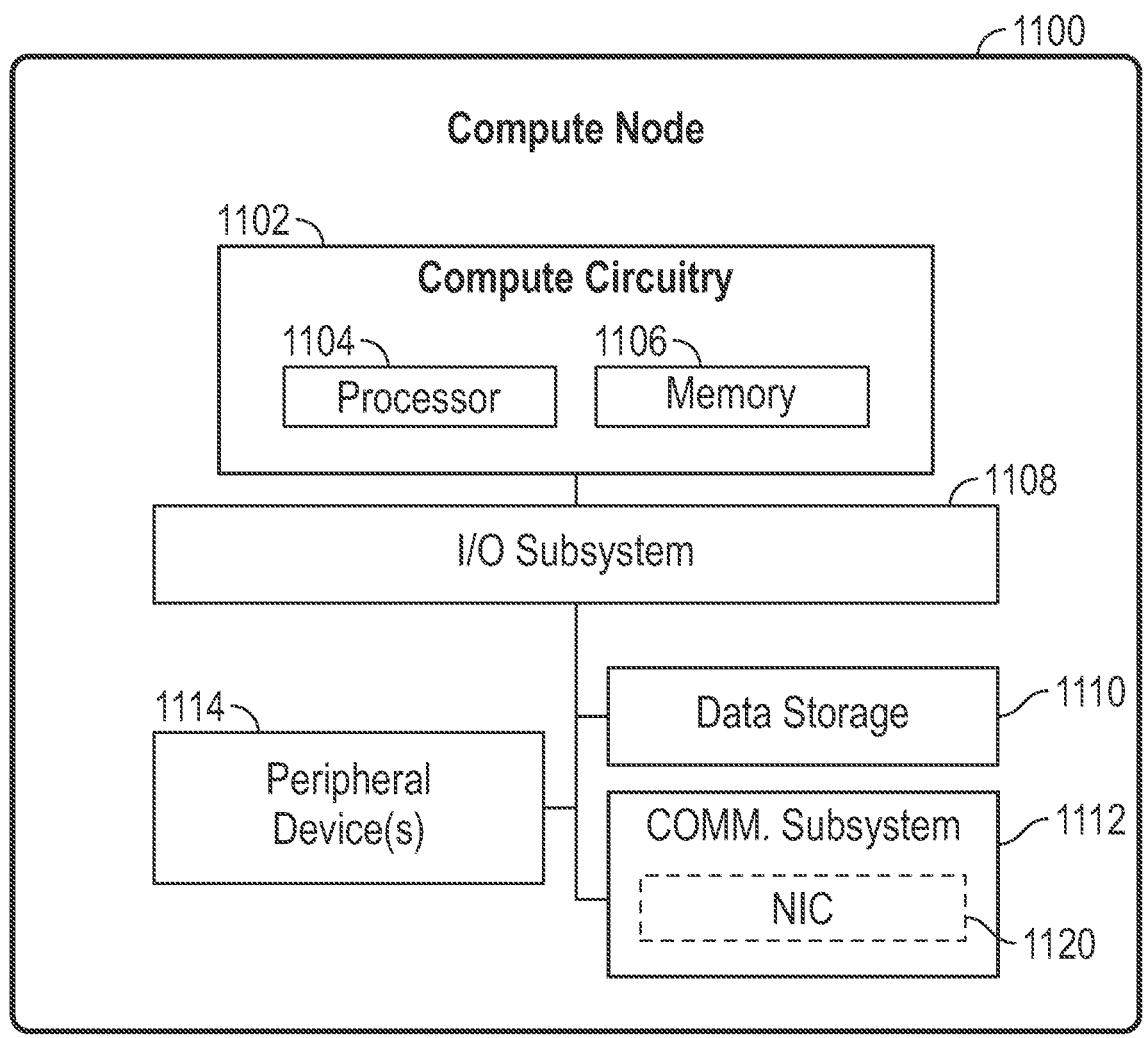
FIG. 8A provides an overview of example components for compute deployed at a compute node in an edge computing system.

In the simplified example depicted in FIG. 8A, an edge compute node 1100 includes a compute engine (also referred to herein as "compute circuitry") 1102, an input/output (I/O) subsystem 1108, data storage 1110, a communication circuitry subsystem 1112, and, optionally, one or more peripheral devices 1114. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1100 may be embodied as any type of engine, device, or collection of devices capable of performing various compute functions. In some examples, the compute node 1100 may be embodied as a single device such as an integrated circuit, an embedded system, a field-programmable gate array (FPGA), a system-on-a-chip (SOC), or other integrated system or device. In the illustrative example, the compute node 1100 includes or is embodied as a processor 1104 and a memory 1106. The processor 1104 may be embodied as any type of processor capable of performing the functions described herein (e.g., executing an application). For example, the processor 1104 may be embodied as a multi-core processor(s), a microcontroller, a processing unit, a specialized or special purpose processing unit, or other processor or processing/controlling circuit.

In some examples, the processor 1104 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1104 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1104 may work in coordination with each other to execute many types of operations and instructions within and on behalf of the compute node 1100.

The memory 1106 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1106 may be integrated into the processor 1104. The memory 1106 may store various software and data used during operation such as one or more applications, data operated on by the application(s), libraries, and drivers.

The compute circuitry 1102 is communicatively coupled to other components of the compute node 1100 via the I/O subsystem 1108, which may be embodied as circuitry or components to facilitate input/output operations with the compute circuitry 1102 (e.g., with the processor 1104 or the main memory 1106) and other components of the compute circuitry 1102. For example, the I/O subsystem 1108 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1108 may form a portion of a system-on-a-chip (SoC) and be incorporated, along with one or more of the processor 1104, the memory 1106, and other components of the compute circuitry 1102, into the compute circuitry 1102.

The one or more illustrative data storage devices 1110 may be embodied as any type of devices configured for short-term or long-term storage of data such as, for example, memory devices and circuits, memory cards, hard disk drives, solid-state drives, or other data storage devices. Individual data storage devices 1110 may include a system partition that stores data and firmware code for the data storage device 1110. Individual data storage devices 1110 may also include one or more operating system partitions that store data files and executables for operating systems depending on, for example, the type of compute node 1100.

The communication circuitry 1112 may be embodied as any communication circuit, device, or collection thereof, capable of enabling communications over a network between the compute circuitry 1102 and another compute device (e.g., an edge gateway of an implementing edge computing system). The communication circuitry 1112 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1112 includes a network interface controller (NIC) 1120, which may also be referred to as a host fabric interface (HFI). The NIC 1120 may be embodied as one or more add-in-boards, daughter cards, network interface cards, controller chips, chipsets, or other devices that may be used by the compute node 1100 to connect with another compute device (e.g., an edge gateway node). In some examples, the NIC 1120 may be embodied as part of a system-on-a-chip (SoC) that includes one or more processors, or included on a multichip package that also contains one or more processors. In some examples, the NIC 1120 may include a local processor (not shown) or a local memory (not shown) that are both local to the NIC 1120. In such examples, the local processor of the NIC 1120 may be capable of performing one or more of the functions of the compute circuitry 1102 described herein. Additionally, or alternatively, in such examples, the local memory of the NIC 1120 may be integrated into one or more components of the client compute node at the board level, socket level, chip level, or other levels.

Additionally, in some examples, a respective compute node 1100 may include one or more peripheral devices 1114. Such peripheral devices 1114 may include any type of peripheral device found in a compute device or server such as audio input devices, a display, other input/output devices, interface devices, or other peripheral devices, depending on the particular type of the compute node 1100. In further examples, the compute node 1100 may be embodied by a respective edge compute node (whether a client, gateway, or aggregation node) in an edge computing system or like forms of appliances, computers, subsystems, circuitry, or other components.

Figure 8B:
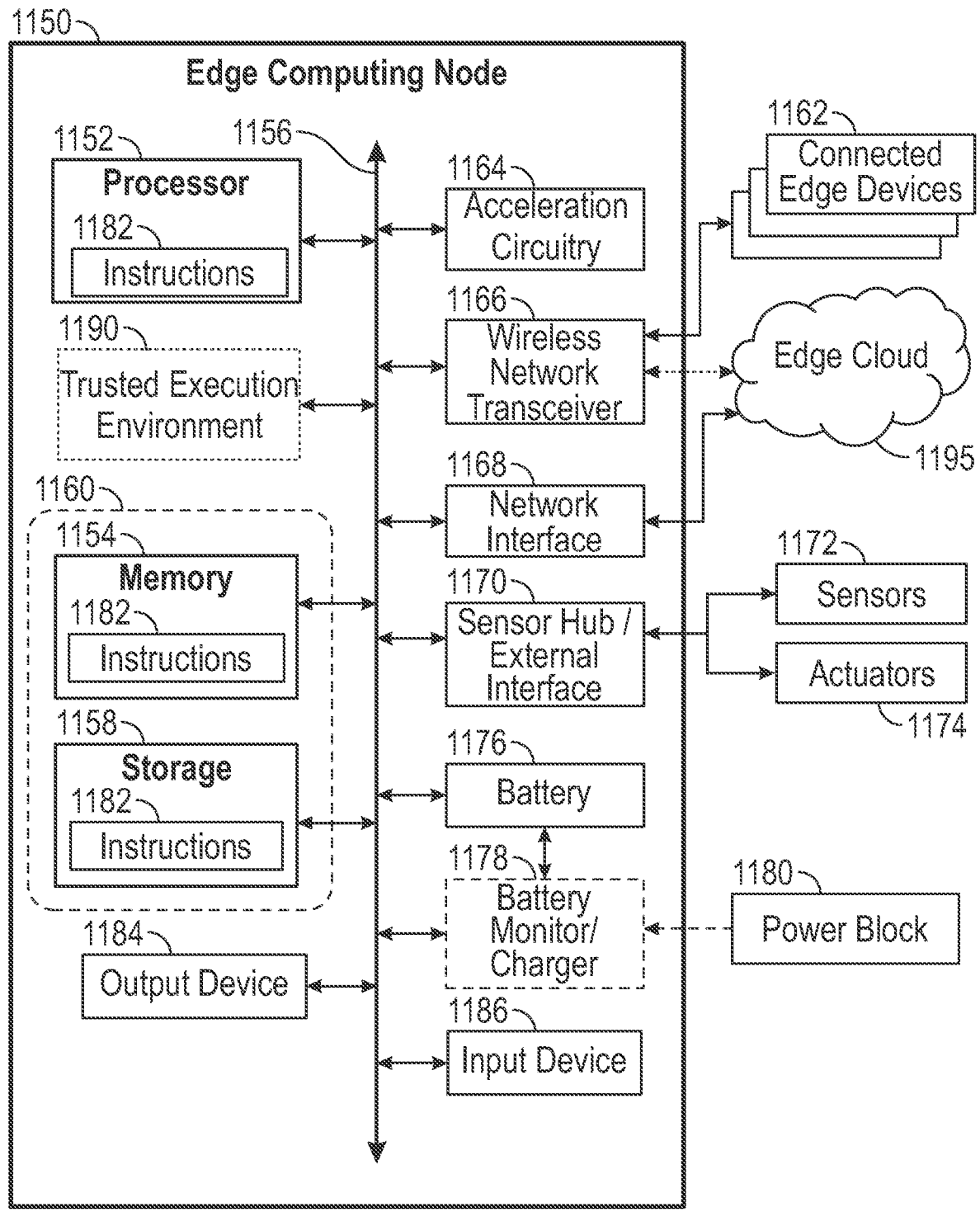
FIG. 8B provides a further overview of example components within a computing device in an edge computing system.

In a more detailed example, FIG. 8B illustrates a block diagram of an example of components that may be present in an edge computing node 1150 for implementing the techniques (e.g., operations, processes, methods, and methodologies) described herein. This edge computing node 1150 provides a closer view of the respective components of node 1100 when implemented as or as part of a computing device (e.g., as a mobile device, a base station, server, gateway, etc.). The edge computing node 1150 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1150, or as components otherwise incorporated within a chassis of a larger system.

The edge computing device 1150 may include processing circuitry in the form of a processor 1152, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1152 may be a part of a system on a chip (SoC) in which the processor 1152 and other components are formed into a single integrated circuit, or a single package, such as the Edison™ or Galileo™ SoC boards from Intel Corporation, Santa Clara, California. As an example, the processor 1152 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1152 and accompanying circuitry may be provided in a single socket form factor, multiple socket form factor, or a variety of other formats, including in limited hardware configurations or configurations that include fewer than all elements shown in FIG. 8B.

The processor 1152 may communicate with a system memory 1154 over an interconnect 1156 (e.g., a bus). Any number of memory devices may be used to provide for a given amount of system memory. As examples, the memory 1154 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid-state disk drive (SSDD). Other devices that may be used for the storage 1158 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in an SoC based system. Other bus systems may be included, such as an Inter-Integrated Circuit (I2C)

interface, a Serial Peripheral Interface (SPI) interface, point to point interfaces, and a power bus, among others.

The interconnect 1156 may couple the processor 1152 to a transceiver 1166, for communications with the connected edge devices 1162. The transceiver 1166 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1162. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1166 (or multiple transceivers) may communicate using multiple standards or radios for communications at a different range. For example, the edge computing node 1150 may communicate with close devices, e.g., within about 10 meters, using a local transceiver based on Bluetooth Low Energy (BLE), or another low power radio, to save power. More distant connected edge devices 1162, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1166 (e.g., a radio transceiver) may be included to communicate with devices or services in a cloud (e.g., an edge cloud 1195) via local or wide area network protocols. The wireless network transceiver 1166 may be a low-power wide-area (LPWA) transceiver that follows the IEEE 802.15.4, or IEEE 802.15.4g standards, among others. The edge computing node 1150 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1166, as described herein. For example, the transceiver 1166 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1166 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1168 may be included to provide a wired communication to nodes of the edge cloud 1195 or to other devices, such as the connected edge devices 1162 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to enable connecting to a second network, for example, a first NIC 1168 providing communications to the cloud over Ethernet, and a second NIC 1168 providing communications to other devices over another type of network.

Given the variety of types of applicable communications from the device to another component or network, applicable communications circuitry used by the device may include or be embodied by any one or more of components 1164, 1166, 1168, or 1170. Accordingly, in various examples, applicable means for communicating (e.g., receiving, transmitting, etc.) may be embodied by such communications circuitry.

The edge computing node 1150 may include or be coupled to acceleration circuitry 1164, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1156 may couple the processor 1152 to a sensor hub or external interface 1170 that is used to connect additional devices or subsystems. The devices may include sensors 1172, such as accelerometers, level sensors, flow sensors, optical light sensors, camera sensors, temperature sensors, global navigation system (e.g., GPS) sensors, pressure sensors, barometric pressure sensors, and the like. The hub or interface 1170 further may be used to connect the edge computing node 1150 to actuators 1174, such as power switches, valve actuators, an audible sound generator, a visual warning device, and the like.

In some optional examples, various input/output (I/O) devices may be present within or connected to, the edge computing node 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1150. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1176 may power the edge computing node 1150, although, in examples in which the edge computing node 1150 is mounted in a fixed location, it may have a power supply coupled to an electrical grid, or the battery may be used as a backup or for temporary capabilities. The battery 1176 may be a lithium ion battery, or a metal-air battery, such as a zinc-air battery, an aluminum-air battery, a lithium-air battery, and the like.

A battery monitor/charger 1178 may be included in the edge computing node 1150 to track the state of charge (SoCh) of the battery 1176, if included. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1178 may communicate the information on the battery 1176 to the processor 1152 over the interconnect 1156. The battery monitor/charger 1178 may also include an analog-to-digital (ADC) converter that enables the processor 1152 to directly monitor the voltage of the battery 1176 or the current flow from the battery 1176. The battery parameters may be used to determine actions that the edge computing node 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the edge computing node 1150. A wireless battery charging circuit, such as an LTC4020 chip from Linear Technologies of Milpitas, California, among others, may be included in the battery monitor/charger 1178. The specific charging circuits may be selected based on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine-readable medium 1160 including code to direct the processor 1152 to perform electronic operations in the edge computing node 1150. The processor 1152 may access the non-transitory, machine-readable medium 1160 over the interconnect 1156. For instance, the non-transitory, machine-readable medium 1160 may be embodied by devices described for the storage 1158 or may include specific storage units such as optical disks, flash drives, or any number of other hardware devices. The non-transitory, machine-readable medium 1160 may include instructions to direct the processor 1152 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1182 on the processor 1152 (separately, or in combination with the instructions 1182 of the machine readable medium 1160) may configure execution or operation of a trusted execution environment (TEE) 1190. In an example, the TEE 1190 operates as a protected area accessible to the processor 1152 for secure execution of instructions and secure access to data. Various implementations of the TEE 1190, and an accompanying secure area in the processor 1152 or the memory 1154 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1150 through the TEE 1190 and the processor 1152.

Figure 9:
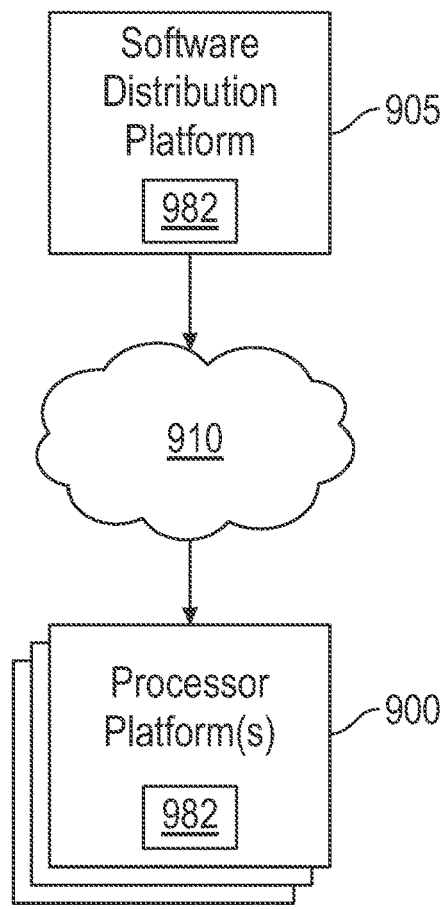
FIG. 9 illustrates an example software distribution platform to distribute software.

FIG. 9 illustrates an example software distribution platform 905 to distribute software, such as the example computer readable instructions 982 of FIG. 9, to one or more devices, such as example processor platform(s) 900 or connected edge devices. The example software distribution platform 905 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 905). Example connected edge devices may operate in commercial or home automation environments. In some examples, a third party is a developer, a seller, or a licensor of software such as the example computer readable instructions 982 of FIG. 9. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 9, the software distribution platform 905 includes one or more servers and one or more storage devices. The storage devices store the computer readable instructions 982, which may correspond to the example computer readable instructions illustrated in the figures and described herein. The one or more servers of the example software distribution platform 905 are in communication with a network 910, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 982 from the software distribution platform 905. For example, the software, which may correspond to the example computer readable instructions described herein, may be downloaded to the example processor platform(s) 900 (e.g., example connected edge devices), which are to execute the computer readable instructions 982 to implement the technique. In some examples, one or more servers of the software distribution platform 905 are communicatively connected to one or more security domains or security devices through which requests and transmissions of the example computer readable instructions 982 must pass. In some examples, one or more servers of the software distribution platform 905 periodically offer, transmit, or force updates to the software (e.g., the example computer readable instructions 982 of FIG. 9) to ensure improvements, patches, updates, etc. are distributed and applied to the software at the end user devices.

In the illustrated example of FIG. 9, the computer readable instructions 982 are stored on storage devices of the software distribution platform 905 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 982 stored in the software distribution platform 905 are in a first format when transmitted to the example processor platform(s) 900. In some examples, the first format is an executable binary in which particular types of the processor platform(s) 900 can execute. However, in some examples, the first format is uncompiled code that requires one or more preparation tasks to transform the first format to a second format to enable execution on the example processor platform(s) 900. For instance, the receiving processor platform(s) 900 may need to compile the computer readable instructions 982 in the first format to generate executable code in a second format that is capable of being executed on the processor platform(s) 900. In still other examples, the first format is interpreted code that, upon reaching the processor platform(s) 900, is interpreted by an interpreter to facilitate execution of instructions.

Figure 10:
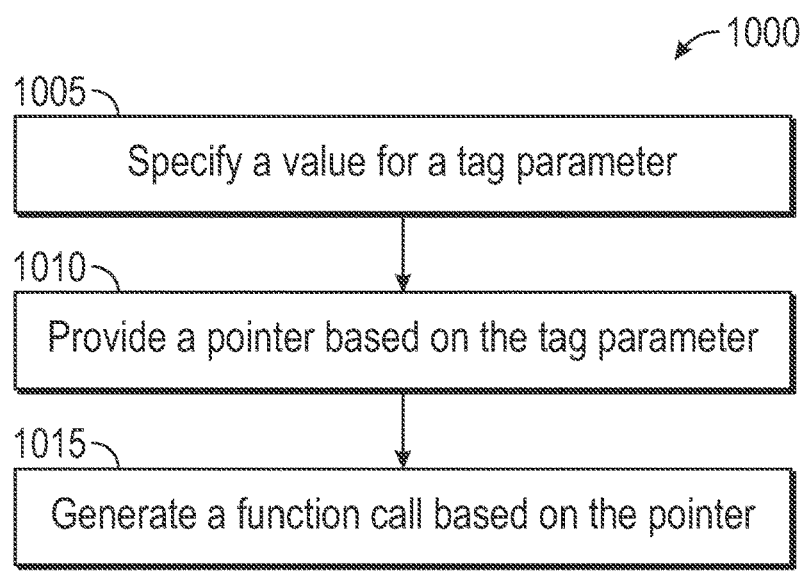
FIG. 10 illustrates a flow diagram of an example of a method for tag checking procedure calls, according to an embodiment.

FIG. 10 illustrates a flow diagram of an example of a method 1000 for tag checking procedure calls, according to an embodiment. The operations of the method 1000 are implement in computational hardware such as that described above or below (e.g., processing circuitry).

At operation 1005 a value for a color (or other tag parameter) is specified in a program-counter relative (PC-relative) call instruction from a call site to a call target. The tag parameter can comprise a color assigned to the call target.

At operation 1010, a pointer is provided to steer the PC-relative call instruction to the call target. The upper bits of the pointer can include the color or other tag parameter.

At operation 1015, a function call to the call target is generated based on the pointer.

Figure 11:
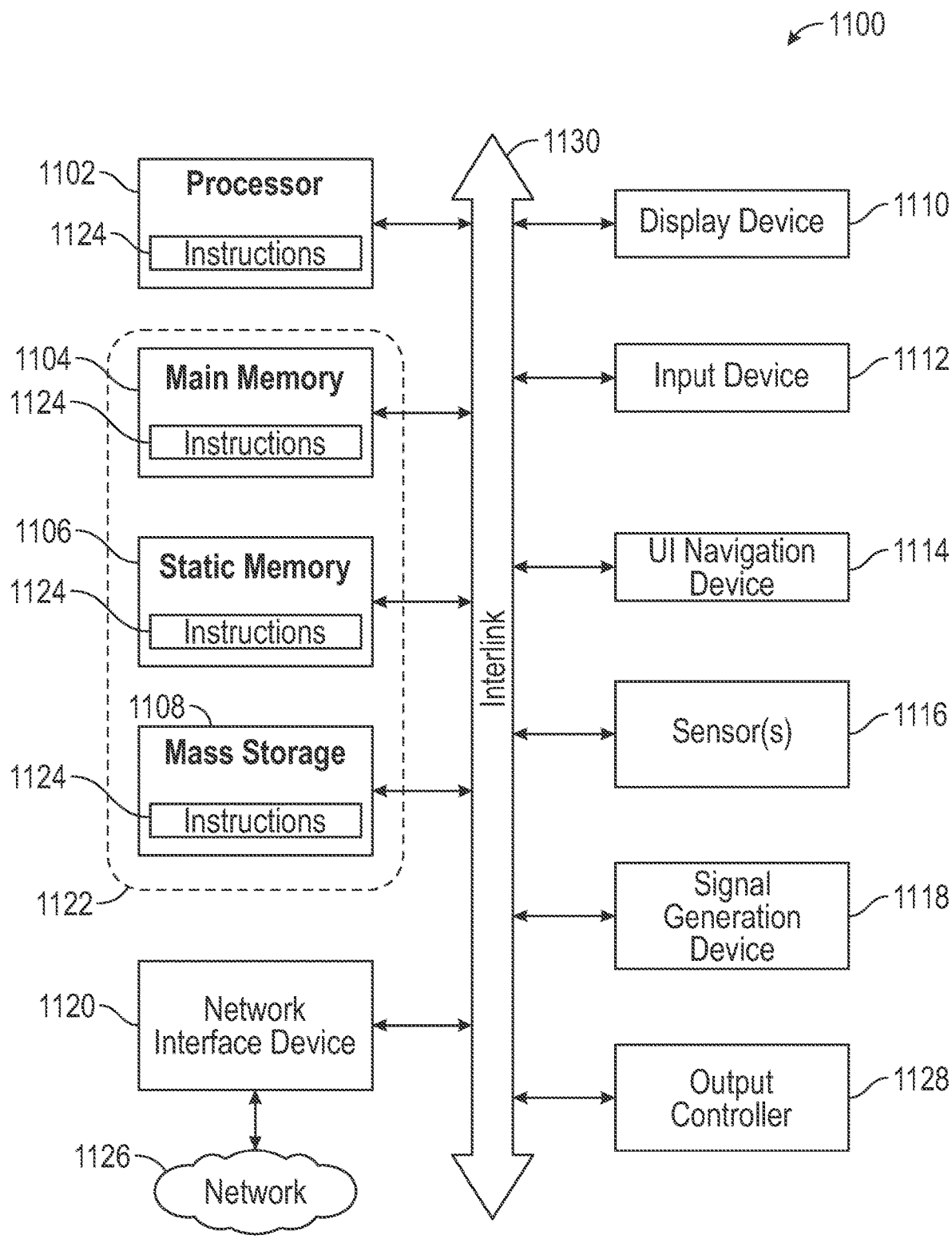
FIG. 11 is a block diagram illustrating an example of a machine upon which one or more embodiments may be implemented.

FIG. 11 illustrates a block diagram of an example machine 1100 upon which any one or more of the techniques (e.g., methodologies) discussed herein may perform. Examples, as described herein, may include, or may operate by, logic or a number of components, or mechanisms in the machine 1100. Circuitry (e.g., processing circuitry) is a collection of circuits implemented in tangible entities of the machine 1100 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1100 follow.

In alternative embodiments, the machine 1100 may operate as a standalone device or may be connected (e.g., networked) to other machines. In a networked deployment, the machine 1100 may operate in the capacity of a server machine, a client machine, or both in server-client network environments. In an example, the machine 1100 may act as a peer machine in peer-to-peer (P2P) (or other distributed) network environment. The machine 1100 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1100 may include a hardware processor 1102 (e.g., a central processing unit (CPU), a graphics processing unit (GPU), a hardware processor core, or any combination thereof), a main memory 1104, a static memory (e.g., memory or storage for firmware, microcode, a basic-input-output (BIOS), unified extensible firmware interface (UEFI), etc.) 1106, and mass storage 1108 (e.g., hard drives, tape drives, flash storage, or other block devices) some or all of which may communicate with each other via an interlink (e.g., bus) 1130. The machine 1100 may further include a display unit 1110, an alphanumeric input device 1112 (e.g., a keyboard), and a user interface (UI) navigation device 1114 (e.g., a mouse). In an example, the display unit 1110, input device 1112 and UI navigation device 1114 may be a touch screen display. The machine 1100 may additionally include a storage device (e.g., drive unit) 1108, a signal generation device 1118 (e.g., a speaker), a network interface device 1120, and one or more sensors 1116, such as a global positioning system (GPS) sensor, compass, accelerometer, or another sensor. The machine 1100 may include an output controller 1128, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1102, the main memory 1104, the static memory 1106, or the mass storage 1108 may be, or include, a machine readable medium 1122 on which is stored one or more sets of data structures or instructions 1124 (e.g., software) embodying or utilized by any one or more of the techniques or functions described herein. The instructions 1124 may also reside, completely or at least partially, within any of registers of the processor 1102, the main memory 1104, the static memory 1106, or the mass storage 1108 during execution thereof by the machine 1100. In an example, one or any combination of the hardware processor 1102, the main memory 1104, the static memory 1106, or the mass storage 1108 may constitute the machine readable media 1122. While the machine readable medium 1122 is illustrated as a single medium, the term "machine readable medium" may include a single medium or multiple media (e.g., a centralized or distributed database, or associated caches and servers) configured to store the one or more instructions 1124.

The term "machine readable medium" may include any medium that is capable of storing, encoding, or carrying instructions for execution by the machine 1100 and that cause the machine 1100 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1122 may be representative of the instructions 1124, such as instructions 1124 themselves or a format from which the instructions 1124 may be derived. This format from which the instructions 1124 may be derived may include source code, encoded instructions (e.g., in compressed or encrypted form), packaged instructions (e.g., split into multiple packages), or the like. The information representative of the instructions 1124 in the machine readable medium 1122 may be processed by processing circuitry into the instructions to implement any of the operations discussed herein. For example, deriving the instructions 1124 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1124.

In an example, the derivation of the instructions 1124 may include assembly, compilation, or interpretation of the information (e.g., by the processing circuitry) to create the instructions 1124 from some intermediate or preprocessed format provided by the machine readable medium 1122. The information, when provided in multiple parts, may be combined, unpacked, and modified to create the instructions 1124. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1124 may be further transmitted or received over a communications network 1126 using a transmission medium via the network interface device 1120 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards, IEEE 802.15.4 family of standards, peer-to-peer (P2P) networks, among others. In an example, the network interface device 1120 may include one or more physical jacks (e.g., Ethernet, coaxial, or phone jacks) or one or more antennas to connect to the communications network 1126. In an example, the network interface device 1120 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1100, and includes digital or analog communications signals or other intangible medium to facilitate communication of such software. A transmission medium is a machine readable medium.

Additional Notes & Examples

Example 1 is a non-transitory machine readable medium including instructions for tag checking procedure calls, the instructions, when executed by processing circuitry, cause the processing circuitry to perform operations comprising: specifying a value for a color in a program-counter relative (PC-relative) call instruction from a call site to a call target; providing a pointer to steer the PC-relative call instruction to the call target based on the color; and generating a function call to the call target based on the pointer.

In Example 2, the subject matter of Example 1 can optionally include wherein the color comprises a color assigned to the call target.

In Example 3, the subject matter of any of Examples 1-2 can optionally include wherein upper bits of the pointer include the color.

In Example 4, the subject matter of any one of Examples 1-3 can optionally include wherein a prototype of the call target specifies a correct color for the call target.

In Example 5, the subject matter of Example 4 can optionally include wherein the prototype and the color are read from a read-only memory.

In Example 6, the subject matter of Example 5 can optionally include wherein the instructions further include verifying the function call is from an authorized call site.

In Example 7, the subject matter of Example 6 can optionally include wherein the verifying comprises comparing the correct color with the color within the pointer.

In Example 8, the subject matter of Example 6 can optionally include wherein the correct color comprises a default color that has not been assigned specifically to the call target, and wherein the verifying comprises comparing the default color with the color within the pointer.

In Example 9, the subject matter of any one of Example 2 1-8 can optionally include wherein the color comprises a color assigned to the call target.

In Example 10, an apparatus comprises memory configured to store tag parameters for assigning to call targets; and processing circuitry coupled to the memory and configured to specify a value for a tag parameter in a program-counter relative (PC-relative) call instruction from a call site to a call target, wherein the tag parameter comprises a color assigned to the call target; provide a pointer to steer the PC-relative call instruction to the call target based on the tag parameter; and generate a function call to the call target based on the pointer.

In Example 11, the subject matter of Example 10 can optionally include wherein the memory comprises read-only memory.

In Example 12, the subject matter of any one of Examples 10-11 can optionally include wherein upper bits of the pointer include the tag parameter.

In Example 13, the subject matter of any one of Examples 10-12 can optionally include wherein the processing circuitry is further configured to verify that the function call is from an authorized call site.

In Example 14, the subject matter of Example 13 can optionally include wherein a prototype of the call target specifies a correct tag parameter for the call target and wherein the verifying comprises comparing the correct tag parameter with the tag parameter within the pointer.

In Example 15, the subject matter of any one of Examples 10-14 can optionally include wherein the call site and the call target are on different compilation units, and wherein address placement of the different compilation units are determined at run time.

In Example 16, a method comprises specifying a value for a color in a program-counter relative (PC-relative) call instruction from a call site to a call target; providing a pointer to steer the PC-relative call instruction to the call target wherein upper bits of the pointer include the color; and generating a function call to the call target based on the pointer.

In Example 17, the subject matter of Example 16 can optionally include wherein a prototype of the call target specifies a correct color for the call target, and wherein the method further comprises reading the prototype and the color from read-only memory.

In Example 18, the subject matter of any one of Examples 16-17 can optionally include verifying the function call is from an authorized call site.

In Example 19, the subject matter of Example 18 can optionally include wherein a prototype of the call target specifies a correct color for the call target and wherein the verifying comprises comparing the correct color with the color within the pointer.

In Example 20, the subject matter of any one of Examples 18-19 can optionally include storing the pointer for subsequent calls to the call target.

In Example 21, the subject matter of Example 20 can optionally include storing the pointer for subsequent calls to the call target.

Example 22 is an apparatus comprising means to implement of any of Examples 1-21.

Example 23 is a system to implement of any of Examples 1-22.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. At least one non-transitory machine readable medium including instructions for tag checking procedure calls, the instructions, when executed by processing circuitry, cause the processing circuitry to perform operations comprising:
specifying a value for a color in a program-counter relative (PC-relative) call instruction from a call site to a call target, wherein a prototype of the call target specifies a correct color for the call target;
providing a pointer to steer the PC-relative call instruction to the call target based on the color; and
generating a function call to the call target based on the pointer.

2. The non-transitory machine readable medium of claim 1, wherein the color comprises a color assigned to the call target.

3. The non-transitory machine readable medium of claim 1, wherein upper bits of the pointer include the color.

4. The non-transitory machine readable medium of claim 1, wherein the prototype and the color are read from a read-only memory.

5. The non-transitory machine readable medium of claim 4, wherein the instructions further include verifying the function call is from an authorized call site.

6. The non-transitory machine readable medium of claim 5, wherein the verifying comprises comparing the correct color with the color within the pointer.

7. The non-transitory machine readable medium of claim 5, wherein the correct color comprises a default color that has not been assigned specifically to the call target, and wherein the verifying comprises comparing the default color with the color within the pointer.

8. The non-transitory machine readable medium of claim 1, wherein the call site and the call target are on different compilation units, and wherein address placement of the different compilation units are determined at run time.

9. A system comprising:
memory configured to store tag parameters for assigning to call targets; and
processing circuitry coupled to the memory and configured to:
specify a value for a tag parameter in a program-counter relative (PC-relative) call instruction from a call site to a call target, wherein the tag parameter comprises a color assigned to the call target, wherein a prototype of the call target specifies a correct tag parameter for the call target;
provide a pointer to steer the PC-relative call instruction to the call target based on the tag parameter; and
generate a function call to the call target based on the pointer.

10. The system of claim 9, wherein the memory comprises read-only memory.

11. The system of claim 9, wherein upper bits of the pointer include the tag parameter.

12. The system of claim 9, wherein the processing circuitry is further configured to verify that the function call is from an authorized call site.

13. The system of claim 12, wherein the authorized call site is in a domain separate from a domain of the call target.

14. The system of claim 13, wherein the verifying comprises comparing the correct tag parameter with the tag parameter within the pointer.

15. The system of claim 9, wherein the call site and the call target are on different compilation units, and wherein address placement of the different compilation units are determined at run time.

16. A method comprising:
specifying a value for a color in a program-counter relative (PC-relative) call instruction from a call site to a call target, wherein a prototype of the call target specifies a correct color for the call target;
providing a pointer to steer the PC-relative call instruction to the call target wherein upper bits of the pointer include the color; and
generating a function call to the call target based on the pointer.

17. The method of claim 16, wherein the method further comprises reading the prototype and the color from read-only memory.

18. The method of claim 16, further comprising verifying the function call is from an authorized call site.

19. The method of claim 18, wherein the verifying comprises comparing the correct color with the color within the pointer.

20. The method of claim 18, further comprising storing the pointer for subsequent calls to the call target.

21. The method of claim 20, further comprising verifying subsequent function calls to the call target based on the pointer.

22. A system comprising:
means to store tag parameters for assigning to call targets; and
processing means to:
specify a value for a tag parameter in a program-counter relative (PC-relative) call instruction from a call site to a call target, wherein the tag parameter comprises a color assigned to the call target, and wherein a prototype of the call target specifies a tag parameter for the call target;
provide a pointer to steer the PC-relative call instruction to the call target based on the tag parameter; and
generate a function call to the call target based on the pointer.

23. The system of claim 22, wherein the processing means is further configured to verify that the function call is from an authorized call site.

24. The system of claim 23, wherein the authorized call site is in a domain separate from a domain of the call target.

* * * * *